UNITED STATES PATENT OFFICE.

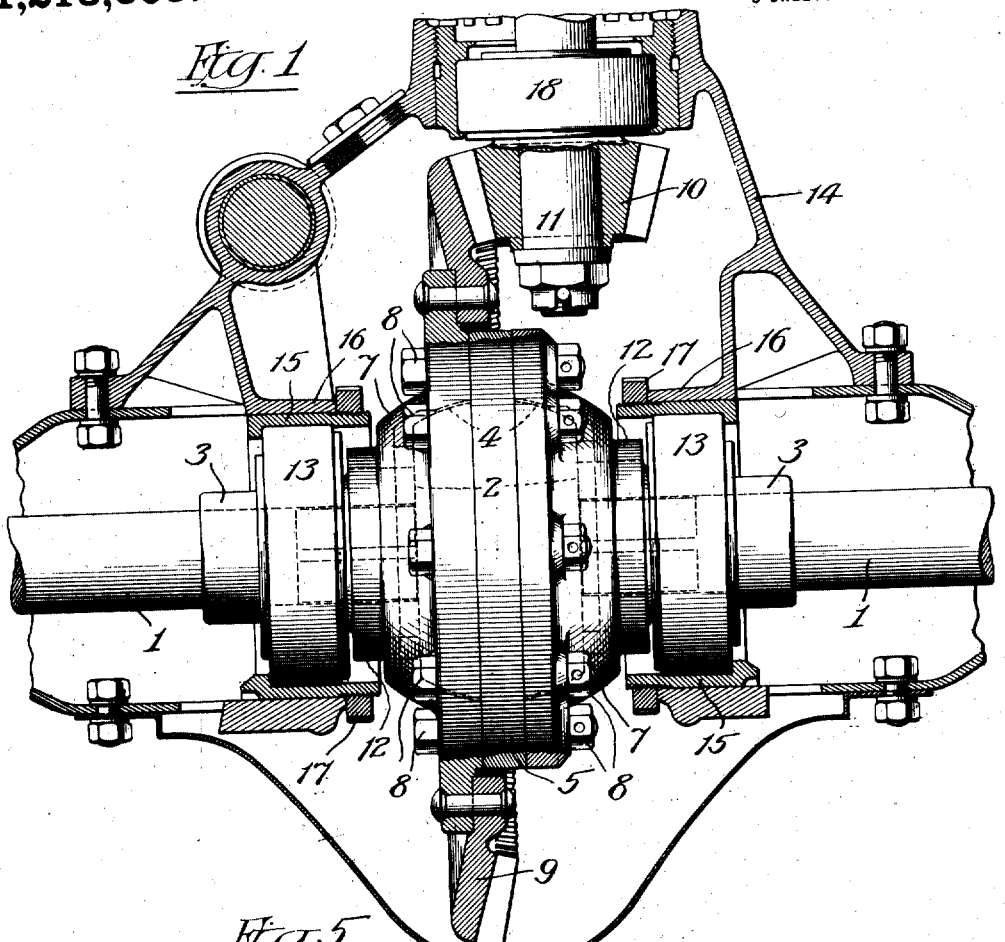
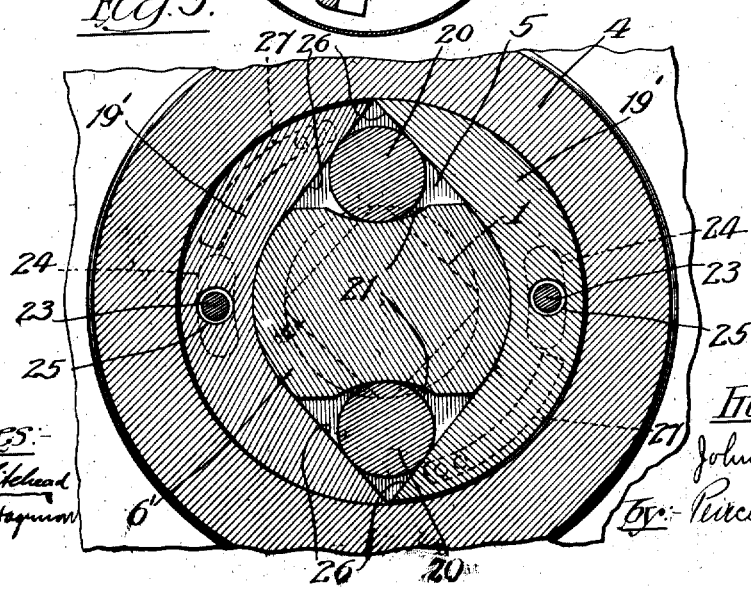

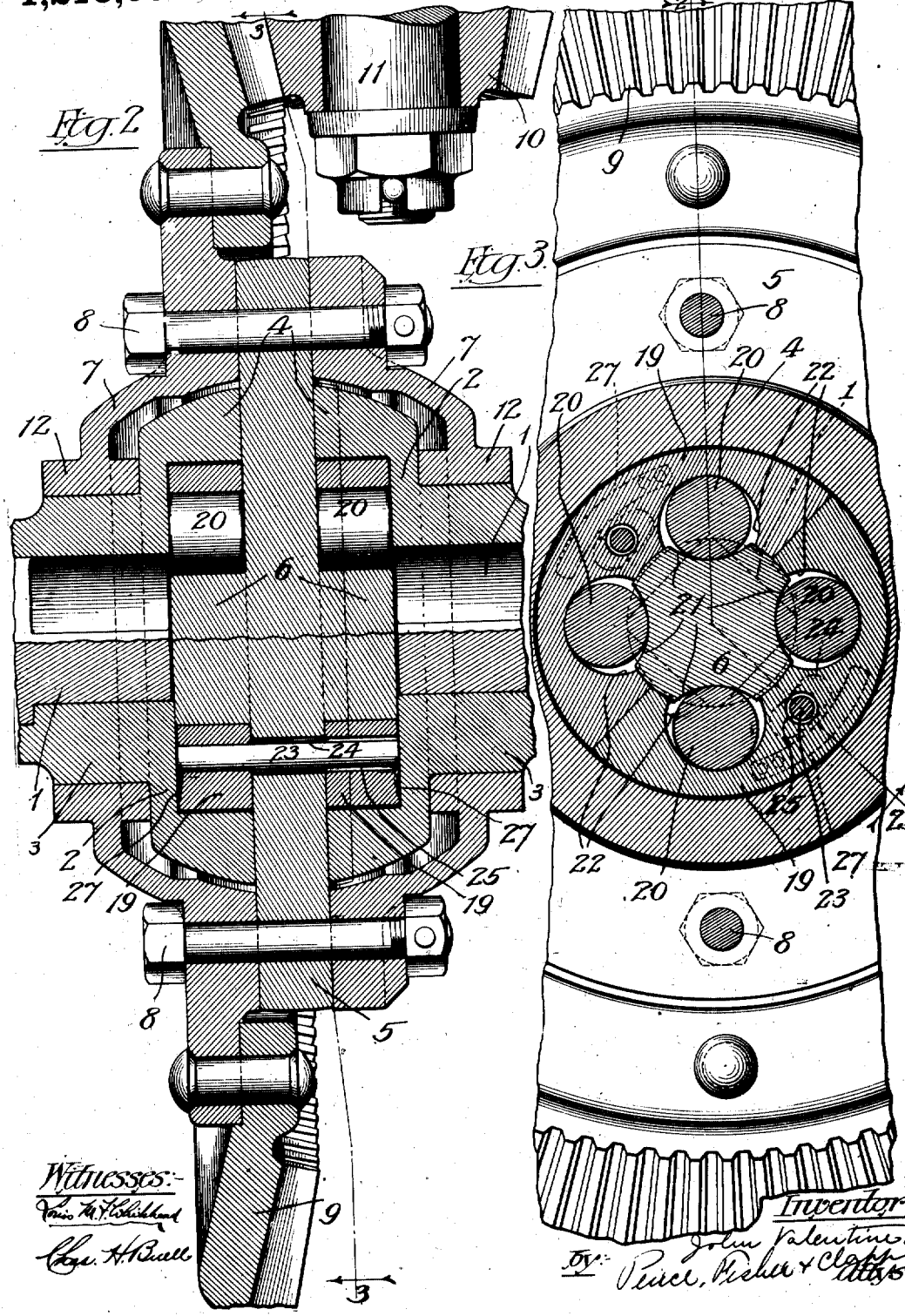

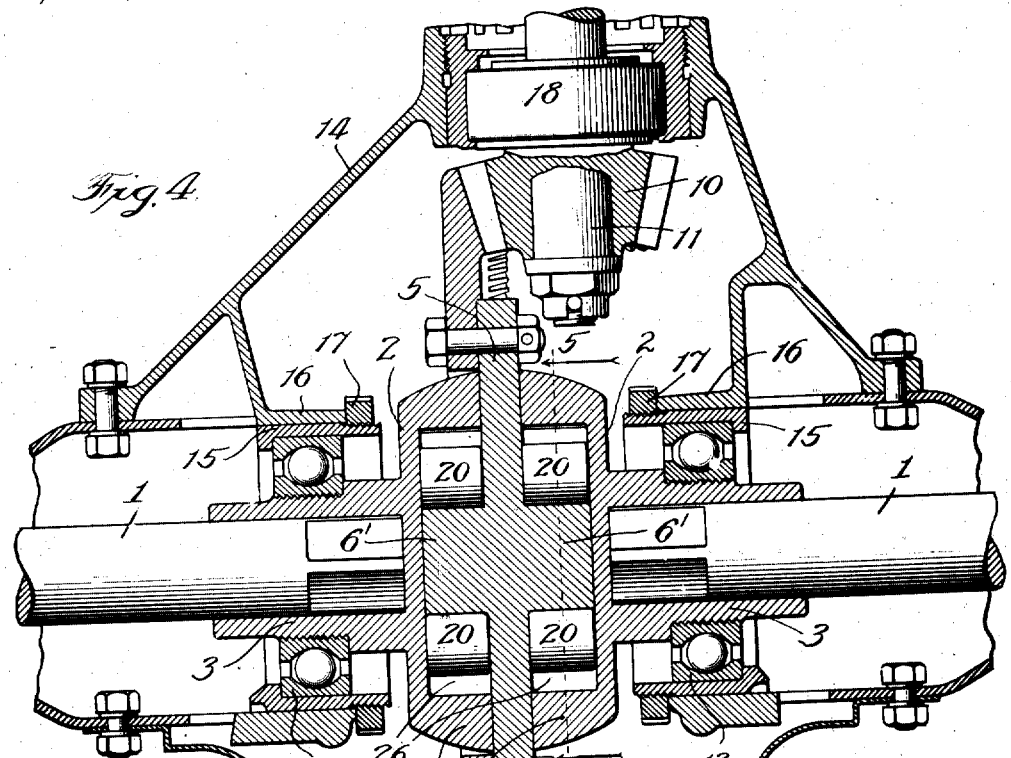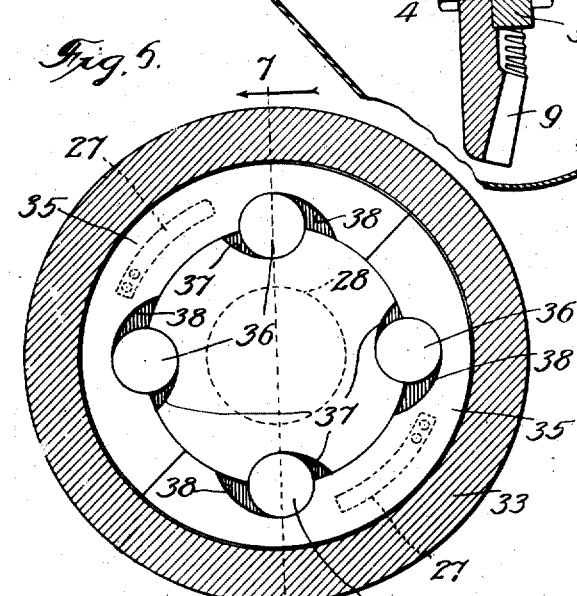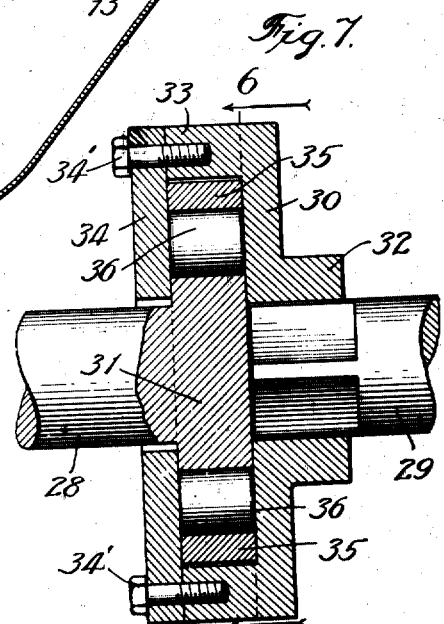

JOHN VALENTINE, OF CHICAGO, ILLINOIS.

POWER-TRANSMISSION MECHANISM.

1,213,303.  Specification of Letters Patent.  Patented Jan. 23, 1917.

Application filed December 20, 1913. Serial No. 808,030.

*To all whom it may concern:*

Be it known that I, JOHN VALENTINE, a citizen of the United States, and a resident of Chicago, county of Cook, and State of Illinois, have invented certain new and useful Improvements in Power-Transmission Mechanism, of which the following is a full, clear, and exact description.

The invention relates to transmission mechanism and seeks to provide simple and effective power transmitting clutch mechanism which will act automatically to securely connect the driving and driven members and which will automatically and quickly release when the driven member overruns or rotate faster than the driving member.

More particularly, the invention seeks to provide simple and effective power transmitting clutch mechanism for positively driving the traction wheels of power propelled vehicles and which clutch mechanism will readily release, so that one of the traction wheels may rotate faster than the driving member in rounding curves.

The invention consists in the features of improvement hereinafter set forth, illustrated in the preferred form in the accompanying drawings and more particularly pointed out in the appended claims.

Figure 1 is a view partially in section and partially in elevation, of a form of the improved power transmission mechanism which is particularly adapted for driving the traction wheels of a vehicle. Fig. 2 is a detail section thereof on the line 2—2 of Fig. 3. Fig. 3 is a section on the line 3—3 of Fig. 2. Fig. 4 is a section of a modified form of transmission mechanism for motor vehicles. Fig. 5 is a detail section on the line 5—5 of Fig. 4. Fig. 6 is a cross-section on the line 6—6 of Fig. 7, and Fig. 7 is a longitudinal section on the line 7—7 of Fig. 6, illustrating a one-way power transmitting clutch mechanism embodying the present invention.

In the form shown, in Figs. 1, 2 and 3, the driven members are mounted upon the inner ends of the alined shafts 1, the outer ends of which are connected to the traction wheels of the motor vehicle. Obviously, the alined shafts 1 may constitute the sections of a divided axle with the traction wheels directly mounted upon the outer ends thereof, or the outer ends of the shafts 1 may be geared to the traction wheels. The driven members on the inner ends of the shafts 1 comprise clutch disks 2 which are fixed to the shafts. Preferably, the latter are provided with squared inner ends which fit correspondingly shaped portions of the bores of the outwardly projecting disk hubs 3. The clutch disks 2 are provided with inwardly projecting peripheral flanges or friction rims 4 having internal friction surfaces that are preferably cylindrical.

A rotatable driving member or disk 5 is interposed between the friction rims 4 of the clutch disks and in axial alinement therewith, and is provided upon its opposite sides with laterally projecting cam hubs 6 that are arranged within the friction rims 4. In the form shown in Figs. 1, 2 and 3, the driving member, in addition to the central disk 5, comprises two chambered sections 7, the outer flanged edges of which are secured to the projecting edge portion of the central disk 5 by bolts 8. The edge flange of one of the chambered sections 7 is extended and an annular, beveled gear 9 is riveted thereto, as shown, and is adapted to be engaged by a beveled pinion 10 on the end of a drive shaft 11.

The chambered sections 7 are provided with flanged hub portions 12 which are journaled upon the hubs 3 of the clutch disks, and the latter are held in place between the flanged hub portions 12 and the central section or disk 5 of the driving member. In this construction, the driving member is rotatably supported upon the clutch disks which, in turn, are mounted upon the shafts 1. The chambered sections of the driving member hold the clutch disks in place, so that these parts form a unit which can be readily handled and placed in position upon the divided axle of a motor vehicle.

The hubs 3 of the clutch disks are provided with reduced outer end portions and bearings 13 thereon support a suitable inclosing casing 14. The bearings are preferably carried in adjusting sleeves 15 which are arranged within cylindrical seats 16 formed integral with the casing. Adjusting collars 17 are threaded on the inner ends of the sleeves and engage the inner ends of the cylindrical seats 16. A bearing 18 mounted in the casing 14 supports the end of the drive shaft 11.

Clutch devices are interposed between the cam hubs 6 of the driving member and the friction rims 4 of the driven members. These clutch devices comprise segmental shoes 19 which fit loosely between the periphery of the hubs 6 and the internal friction surfaces of the rims 4. Preferably, two semi-circular shoes are arranged between each cam hub and friction rim, the outer surface, of course, being shaped to coöperate with the friction surfaces of the rims, which, as stated, are preferably cylindrical.

The shoes 19 are forced into engagement with the friction rims by wedging rollers 20 which are interposed between the cam hubs and the shoes. In the preferred form shown in Figs. 2 and 3, the outer face of the cam hub 6 and the inner faces of the shoes 19 are provided with curved recesses which form concave seats 21 and 22 for the rollers. These seats are larger than the rollers, that is to say, the radii of the seats are greater than the radius of the rollers, so that the latter are in rolling contact with the surfaces of the seats and so that the surfaces of the seats act as cam faces between which the rollers are wedged when the driving member is rotated. The wedging action of the rollers, of course, forces the shoes 19 outwardly into snug engagement with the friction rims 4 and thereby securely connects the driving and driven members. For effective action in thus forcing the friction shoes into gripping engagement with the friction rims, a number of rollers are interposed between each shoe and the cam hub. In the preferred form shown in Figs. 2 and 3, two wedging rollers are provided for each shoe.

It is obvious that if the driving member is rotated in either direction, the rollers 20 will be wedged between the cam-like surfaces of the seats 20 and 21 to force the shoes 19 outwardly and thus securely connect the driving member to the driven members to rotate the latter. It is also obvious that, if one of the driven members rotates faster than the driving member, the corresponding rollers will be moved to their neutral positions at the large central portions of the seats. In this way, either driven member is quickly released in case it overruns. To prevent the movement of the rollers past their neutral positions in case one of the driven members over-runs, the shoes are provided with coöperating stop devices. In the form shown, these stop devices comprise pins 23 which extend through segmental slots 24 formed in the disk 5 of the driving member, and each pin is fixed to one of the shoes and extends within an enlarged opening 25 in the other shoe. These pins form lost-motion or stop devices between the shoes which prevents the movement of the shoes and rollers past the neutral or idle position when one of the driving members over-runs.

In operation, the wedging rollers 20, which are in rolling contact with the seats 21 and 22 of the cam hubs 6 and friction shoes 19, will exert a powerful wedging action on the shoes and force the same into frictional contact with the rims 4, to thereby couple the driving member to the driven member quickly and with great certainty. The arrangement of the rollers and shoes also permits the quick automatic release of one of the driven members, if it rotates faster than the driving member. If, for example, the member shown at the lefthand in Fig. 2 over-runs, the corresponding rollers 20 will be moved back to neutral, central position. But the righthand friction shoes remain in clutched engagement with the righthand driven member, so that they cannot move forwardly, and the forward movement of the lefthand shoes will be checked when the lost motion is taken up between the pins 23 and the righthand shoes. This will prevent the lefthand shoes from advancing far enough to move the lefthand rollers 20 past their neutral, central position. Similarly, if the righthand driven member over-runs, it will be automatically disengaged from the driven member, but the forward movement of the righthand shoes will be checked by engagement with the stop pins 23 to prevent the movement of the righthand rollers past their neutral, central position and the reëngagement of the righthand shoes. In this way, either one of the driven members can over-run freely, since the stop pins serve to arrest the forward movement of the corresponding set of shoes and to hold the same in neutral position. If both members over-run, both sets of shoes can advance and are not checked by the stop pins 23. The rollers are thus moved forwardly past their neutral, central positions, and the shoes are forced outwardly to exert a braking action upon the over-running driven members and upon the traction wheels connected thereto.

The recessed cam seats are preferably cylindrical, as shown in Figs. 2 and 3, since this arrangement permits the use of large heavy rollers which can well withstand the strains to which they are submitted. If smaller rollers are employed, each seat could be provided with oppositely inclined, straight faces. Preferably, also, each shoe is provided with two or more seats coöperating with two or more rollers, as shown in Figs. 2 and 3.

In the modification shown in Figs. 4 and 5, the cam hubs 6' as in the form shown in Figs. 2 and 3, are provided with concave, cylindrical seats 21 for the rollers 20, but in this form, only two rollers are employed and these rollers are interposed between the ends of the friction shoes 19', the latter being provided with inclined or beveled end faces 26 against which the rollers are forced by the cam-like faces of the seats 21 in the cam hub. In this form shown in Figs. 4 and 5, the bores of the hubs 3 are provided with inner walls against which the ends of the shafts 1 abut and, in this construction, the annular beveled gear 9 is mounted upon the projecting portion of the intermediate disk or driving member 5, so that the driving member is carried by the friction disks through the medium of the shoes 19' and rollers 20. In other respects, the construction shown in Figs. 4 and 5 is similar to that shown in Figs. 1, 2 and 3. The shoes 19 and 19' are preferably provided with retarding friction springs 27 which are secured thereto and arranged in recesses in the outer faces thereof. These springs engage the inner faces of the friction disks 2. When the driving cam hubs and rollers are advanced, the movement of the shoes is retarded by the springs, so that the wedging action of the rollers is effected with great certainty.

While the present invention, in its preferred embodiment, is adapted as a transmitting clutch mechanism for motor vehicles, it may also be employed in a one-way clutch mechanism, as shown, for example, in Figs. 6 and 7. In this construction, the driving and driven members are represented by the alined shafts 28 and 29, one of which is provided with a friction disk 30 and the other with a cam 31. The disk 30 is provided with a hub 32, by which it is fixed to the shaft 29, and it is also provided with a friction rim 33 overhanging the cam or hub 31 on the shaft 29. The shoes 35 are interposed between the rim 33 and cam hub 31 and rollers 36 are arranged in curved concaved seats 37 and 38 formed in the adjacent surfaces of the shoes and cam hub. The shoes 35, like the shoes 19 and 19' previously described, are provided with retarding springs 27. The parts are held in coöperative relation by an annular member 34 which is detachably secured to the friction rim by bolts 34' and which overlaps the cam hub 31, as shown. In this construction, as in the form shown in Figs. 2 and 3, the seats 37 and 38 for each roller are provided, on opposite sides of the roller, with curved, cam-like surfaces between which the rollers are wedged to force the shoes outwardly and connect the driving and driven members when the latter is rotated. But to prevent the wedging of the rollers when the driven member over-runs, portions of the seats 37 and 38 which coöperate with each roller are provided on opposite sides of the roller with surfaces of substantially the same radius as the roller. If we assume that the cam 31 is the driving member and is rotated in righthand direction, the upper roller shown will be wedged between the left hand cam portion of the seat 37 and the right hand cam portion of the seat 38. Then, if the member 33 overruns, the roller will be returned to the position shown in the drawings and in contact with the left hand portion of the seat 38 and the right hand portion of the seat 37. Since these portions of the seats are of the same radius as the roller, they will have no wedging action thereon, and will hold the roller in neutral or idle position until the driving member overtakes the driven member. In this construction, either the friction disk 30 or the cam hub 31 may be the driving member of the clutch. If the friction disk having the rim 33 is the driving member, it would have to be rotated, of course, in lefthand direction, in order to effect the engagement of the clutch members. In the other form shown, the cam hubs are preferably formed upon the driving member. The clutch mechanism shown in Figs. 6 and 7 is well adapted for use with a self-starting device for internal combustion engines.

It is obvious that numerous changes may be made in the details set forth, without departure from the essentials of the invention as defined in the claims.

I claim as my invention:—

1. A power transmission mechanism comprising in combination, rotary driving and driven members in axial alinement, one of said members having a friction rim and the other member having a cam hub arranged within said rim, friction shoes within said rim, and wedging rollers interposed between and in rolling contact with said hub and said shoes, substantially as described.

2. A power transmission mechanism comprising in combination, rotary driving and driven members in axial alinement, one of said members having a friction rim and the other member having a cam hub arranged within said rim, friction shoes within said rim, and wedging rollers interposed between said hub and said shoes, the periphery of said hub being recessed at intervals in its periphery to form enlarged cam seats, said rollers being in rolling contact with said seats, substantially as described.

3. A power transmission mechanism comprising in combination, rotary driving and driven members in axial alinement, one of said members having a friction rim and the other member having a cam hub within said rim, friction shoes within said rim, and wedging rollers interposed between said hub and said shoes, said shoes and said cam hub having curved, recessed, cam seats in their adjacent faces for said rollers, substantially as described.

4. A power transmission mechanism comprising in combination, driving and driven members in axial alinement, a friction disk on one of said members having a rim provided with an internal friction surface, the other member having a cam hub within said rim, friction shoes within said rim, and a plurality of wedging rollers interposed between each of said shoes and said hub, substantially as described.

5. A power transmission mechanism comprising in combination, driving and driven members in axial alinement, a friction disk on one of said members having a rim provided with an internal friction surface, the other of said members having a cam hub within said rim, friction shoes within said rim, and a plurality of wedging rollers interposed between each of said shoes and said hub, said shoes and said hub having enlarged concave seats for said rollers, substantially as described.

6. A power transmission mechanism comprising in combination, driving and driven members in axial alinement, a friction disk on one of said members having a rim provided with an internal friction surface, the other of said members having a cam hub within said rim, friction shoes within said rim, and rollers interposed between said hub and said shoes, one of said parts having enlarged concave seats for said rollers and means for holding said shoes in neutral position, substantially as described.

7. A power transmission mechanism for vehicles and the like, comprising in combination, two driven shafts in axial alinement, disks having hubs and friction rims fixed to the inner adjacent ends of said shafts, a driving member arranged between said friction disks and having cam hubs arranged within the rims thereof, clutch devices interposed between said cam hubs and said rims, and a member having bearings wherein the hubs of said friction disks are journaled, said driving member being carried by said friction disks, substantially as described.

8. A power transmission mechanism for vehicles and the like, comprising in combination, two driven shafts in axial alinement, disks having hubs and friction rims fixed to the inner adjacent ends of said shafts, a driving member arranged between said disks and having cam hubs arranged within the rims thereof, clutch devices interposed between said cam hubs and said rims, and a member having bearings wherein the hubs of said disks are journaled, said driving member having parts inclosing the said disks and loosely journaled on the hubs thereof.

9. A power transmission mechanism for vehicles and the like comprising two driven shafts arranged in axial alinement, friction rims mounted on the inner adjacent ends of said shafts, a driving member interposed between said rims and having cam hubs within said rims, sets of friction shoes within said rims, wedging rollers between said cam hubs and said shoes, and stop devices for determining the relative movement of said sets of shoes.

10. A power transmission mechanism for vehicles and the like comprising two driven shafts arranged in axial alinement, friction rims mounted on the inner adjacent ends of said shafts, a driving member interposed between said rims and having cam hubs within said rims, sets of friction shoes within said rims, and rollers interposed between said hubs and said shoes, said hubs and shoes having recessed, cam seats for said rollers, substantially as described.

11. A power transmission mechanism for vehicles and the like comprising two driven shafts arranged in axial alinement, friction rims mounted on the inner adjacent ends of said shafts, a driving member interposed between said rims and having cam hubs within said rims, sets of friction shoes within said rims, a plurality of rollers interposed between said hubs and each of said shoes, said hubs and shoes having curved, concave, cam seats for said rollers, and a stop device for determining the relative movement of said sets of shoes, substantially as described.

12. A power transmission mechanism comprising in combination, rotary friction and cam members in axial alinement, a friction shoe coöperating with said friction member, said shoe and said cam member having opposed roller seats and a wedging roller interposed between and in rolling contact with said seats.

13. A power transmission mechanism comprising in combination, rotary friction and cam members in axial alinement, friction shoes coöperating with said friction member, said shoes and cam member having opposed cam seats, and wedging rollers interposed between and in rolling contact with said seats.

14. A power transmission mechanism comprising in combination, driving and driven members in axial alinement, a friction disk on one of said members, a cam on the other of said members, friction shoes coöperating with said disk, said shoes and cam being provided with opposed recessed cam seats, and wedging rollers interposed between and in rolling contact with said seats.

JOHN VALENTINE.

Witnesses:
HARRY L. CLAPP,
J. G. ANDERSON.